A. FAY.
APPARATUS FOR OPERATING UPON COMPOSITE SUBSTANCES.
APPLICATION FILED SEPT. 14, 1916.
1,207,888.
Patented Dec. 12, 1916.
3 SHEETS—SHEET 2.
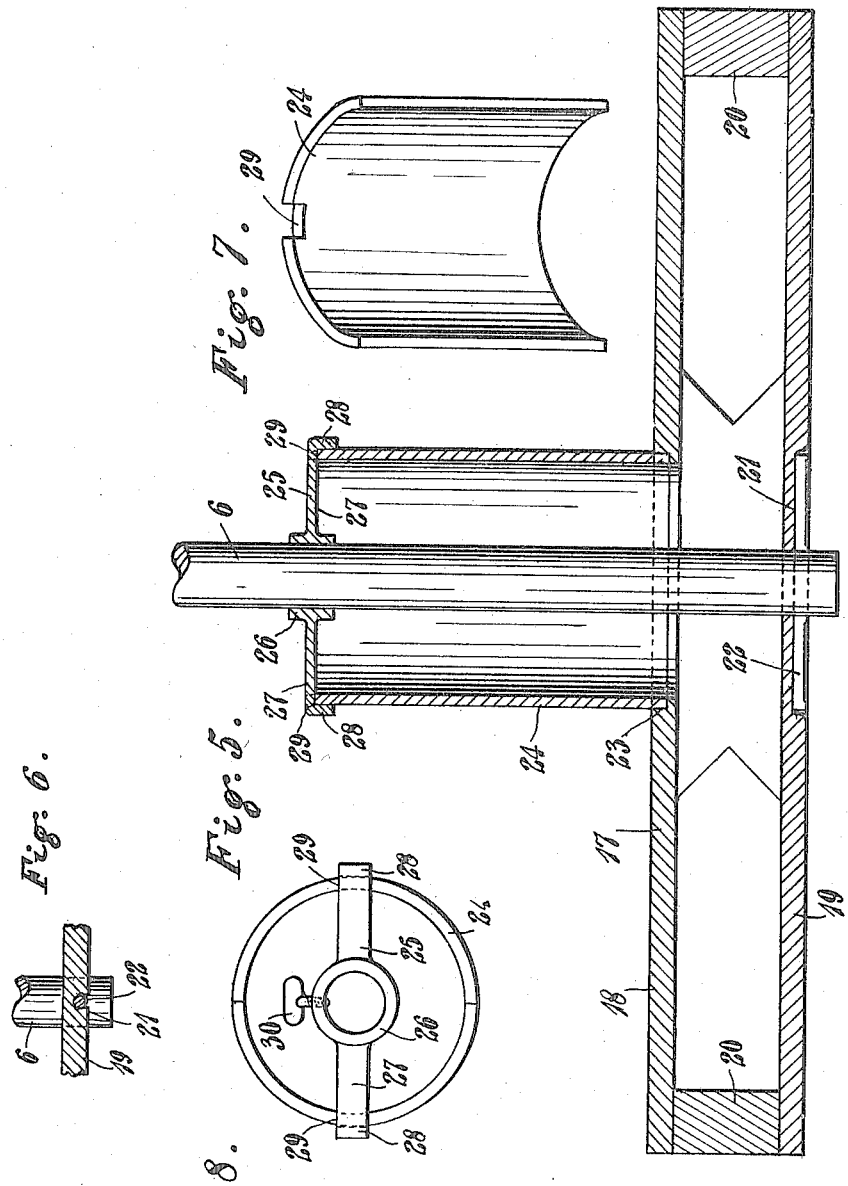
Witnesses:
Clarence Perdew
Edith Poichinger
Inventor
Alpheus Fay

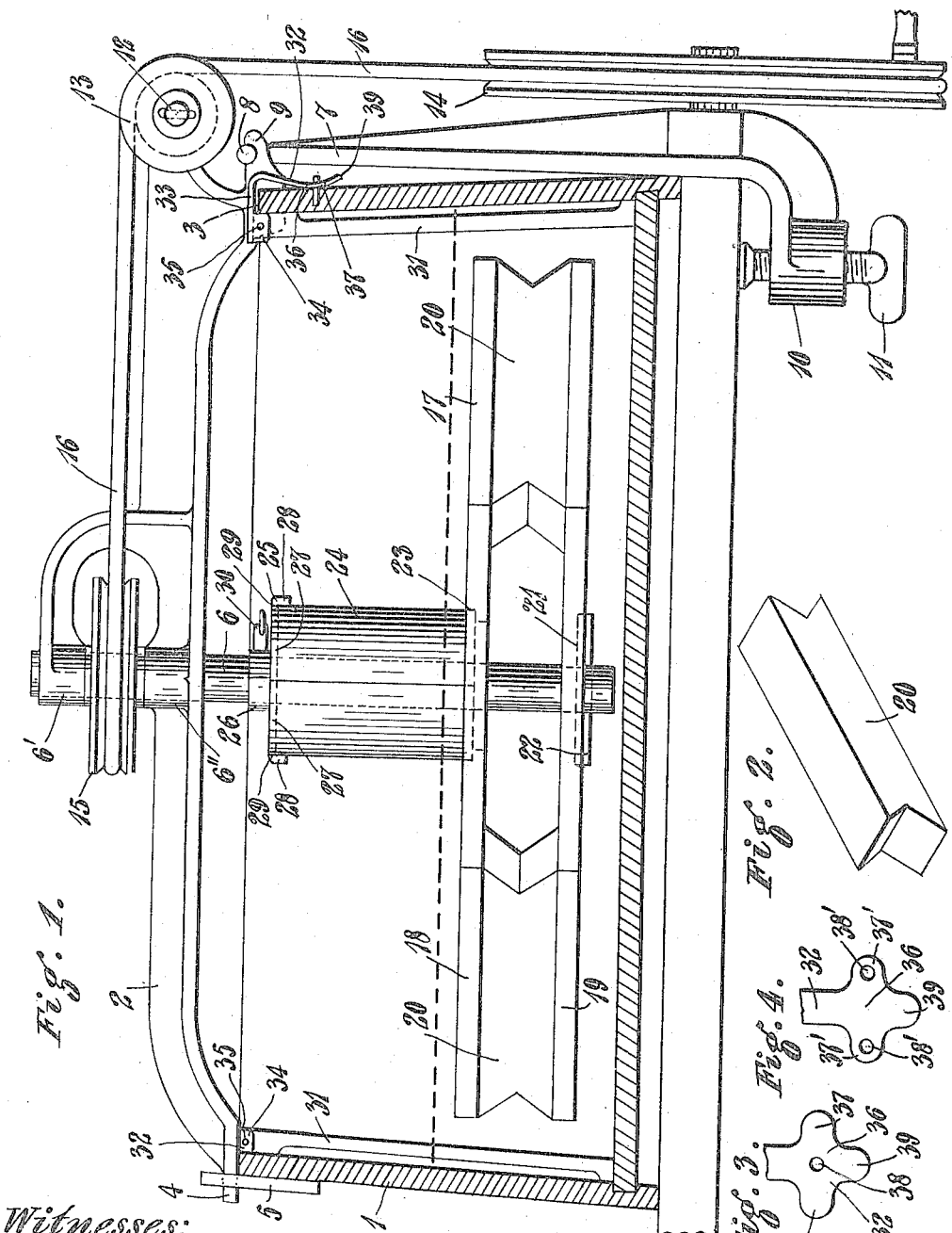

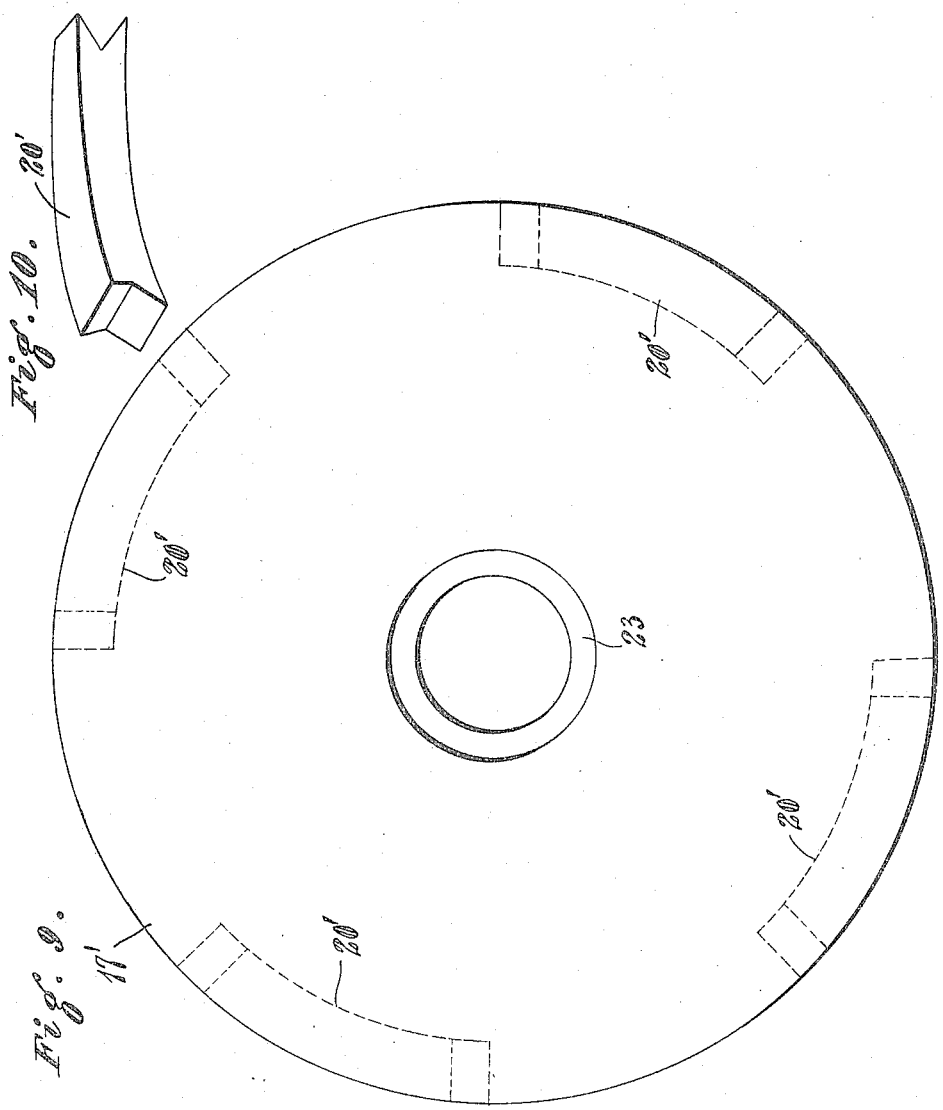

UNITED STATES PATENT OFFICE.

ALPHEUS FAY, OF LOUISVILLE, KENTUCKY.

APPARATUS FOR OPERATING UPON COMPOSITE SUBSTANCES.

1,207,888.　　　　　Specification of Letters Patent.　　Patented Dec. 12, 1916.

Application filed September 14, 1916. Serial No. 120,177.

*To all whom it may concern:*

Be it known that I, ALPHEUS FAY, a citizen of the United States, and a resident of Louisville, in the county of Jefferson and State of Kentucky, have invented a certain new and useful Apparatus for Operating upon Composite Substances, of which the following is a specification.

The object of my invention is to provide a novel method and means to operate upon a comparatively broad shallow body of a composite substance containing butter fat, with the vertical pressure, peripheral pressure and the peripheral surface of said body minimized; and the upper surface, the lower surface and the peripheral diameter of said body maximized to allow said body to partake freely of undulatory movement by rotatable members with their thickness and their peripheral surfaces minimized and their upper surfaces and lower surfaces and diameter maximized;-with the peripheries of said members moving in close proximity with the inside walls of said vessels, the distance from the center to the periphery of said members being greater than the distance from the peripheries of the said members to the inside walls of said vessel; said members rotating said body in the same direction as said members but at a slow velocity compared with the velocity of said members, said vessel having its walls converged with a broad width and a shallow depth to allow the substance in the vessel to rise and fall freely to be acted upon to produce mechanical and chemical changes through its rates of vibrations in the substance, until the cream elements coincidently change into binominal quantities.

A further object of my invention is to simplify the construction of apparatus of the above character, thereby making it more economical of production; and also to make the apparatus readily disassembled for storage and shipping; and to make each part so that when it is detached from the other parts it will very readily be cleaned, so that the entire apparatus may be kept thoroughly sanitary in use.

My invention consists in the apparatus and the parts thereof, and in the details of construction and arrangement of such parts, as will hereinafter be more fully described and claimed.

In the drawings: Figure 1 is a side elevation of apparatus embodying my invention, the tub being shown in section; Fig. 2 is a detail perspective view of one of the spacing blocks of the impeller; Fig. 3 is a detail of the outer end of one of the brake-holding clips; Fig. 4 is a similar view of a modification of the same; Fig. 5 is a vertical cross-section of the impeller and its hollow shaft; Fig. 6 is a fragmentary sectional view of the central part of the lower impeller member and solid shaft on a plane at right angles to that of the section in Fig. 5; Fig. 7 is a detail perspective view of one of the sections of the hollow shaft; Fig. 8 is a plan view of the clamping means on the top of the hollow shaft; Fig. 9 is a plan view of an impeller modified from that of Figs. 1 and 5; and Fig. 10 is a detail perspective view of one of the spacing blocks of this impeller.

The vessel 1 for containing milk elements to be operated upon is of wide and low formation providing an ample base, so that the vessel is readily secured in a substantial manner to a table or other supporting means. The wide and low formation of the vessel in addition to providing a firm foundation therefor, prevents the substance operated upon therein from becoming deep in proportion to its diameter. Keeping the depth of the substance shallow in proportion to its diameter is a very important feature in the satisfactory operation of my apparatus, and for that reason I make my vessel for containing a substance to be operated upon of a wide and low formation, namely, the diameter being greater than its depth. This is according to the method set forth and claimed in my copending applications, Serial No. 744,158, filed Jan. 25, 1913, Serial No. 829,982, filed April 6, 1914, and Serial No. 11,355, filed March 1, 1915.

The bracket 2 is mounted across the top of the vessel 1 with a channel 3 in the lower side of one end part fitting down on the rim of the vessel, and with its other end part 4 straight and fitting under a cleat 5 on the rim of the vessel 1 at the other side. The solid impeller shaft 6 is journaled vertically in upper and lower bearings 6′ and 6″, respectively, at the middle of the bracket. An arm 7 extends down along the outside of the vessel, and its upper end has laterally projecting lugs 8 that engage in upwardly opening hooks 9 that extend out from the bracket 2 adjacent to the channeled part 3. This arm 7, at its bottom, has a part 10 sufficiently far below the bottom of the vessel 1 to pass under the table or other object upon which the vessel is to be supported, and this terminal part 10 has a clamping screw 11 passing up through it to bear against the lower side of the table or other object. With the shank end 4 of the bracket 2 fitting snugly under the cleat 5 and thus supporting and steadying this end of the bracket, and with the channeled part 3 fitting the rim of the vessel 1 snugly, it is thus possible to secure the bracket 2 firmly on the vessel 1, and at the same time secure the vessel firmly on the table or other object.

Immediately above the channeled part 3 of the bracket 2 is an outwardly projecting bearing with a laterally projecting stud 12, on which is journaled a pulley 13 having two annular grooves in its periphery. On the lower part of the arm 7 a driving wheel 14 is rotatably mounted with a single annular groove in its periphery. Fixed on the solid shaft 6 between its bearings 6' and 6'' is a pulley 15 with a single annular groove in its periphery. Around the driving wheel 14 and the pulley 15 is a flexible belt 16 with two strands lying in the respective grooves of the pulley 13. With this construction the tension is applied to the belt 16 in the process of assembling the apparatus and mounting it upon the table or other support. Thus it is necessary only to place the vessel 1 upon the table, place the bracket 2 upon the vessel, then pass the driving belt 16 around the pulley 15 and down over the pulley 13, and then apply the arm 7 with the driving wheel 14 and pass the belt 16 around the driving wheel, whereupon the bringing of the arm 7 into clamping position will tighten the belt 16 properly if it is made of the proper length, giving it the required tension to properly drive the shaft 6.

The impeller 17 is made of the upper member 18 and lower member 19, each thin and flat with upper and lower surfaces plane, with spacing pieces 20 secured between them. The members 18 and 19 are polygonal, and each spacing piece 20 is placed along and conterminous with an alternate side of the member. Also, each spacing piece 20 has its end of V-shaped channeled formation. Both impeller members 18 and 19, and the spacing pieces 20 are preferably made of wood and permanently secured together.

The lower impeller member 19 has an opening in its center through which the solid shaft 6 projects downwardly, and diametrically across its center it has a groove 21 that opens downwardly and extends radially from each side of the opening through which the shaft 6 extends. The shaft 6 has a hole diametrically through it, through which a pin 22 may be passed, and when the impeller is brought down this pin 22 will enter the groove 21 and be held against endwise displacement. This construction is disclosed and claimed in my co-pending application, Serial No. 69,885, filed Jan. 3, 1916.

The upper impeller member 18 has in its upper side an opening with an annular depressed part 23 around it receiving the lower end of the hollow shaft 24, which is preferably also made of wood in two semi-cylindrical sections, such as is shown in Fig. 7, with their lower ends held together by the walls of the depression 23, and with their upper ends held together by a clamping means 25 which comprises a hub 26 with oppositely extending arms 27, having downwardly turned ends 28, with the arms 27 fitting down in upwardly opening notches 29 in the upper ends of the sections of the hollow shaft 24, as best seen in Figs. 5 and 8. The hub 26 has a set screw 30 by which it is clamped to the shaft 6. Thus, the impeller 17 and hollow shaft 24 are clamped tightly together between the pin 22 in the lower part of the shaft 6, and the clamping means above. They are thus caused to turn with the shaft 6 but are readily disassembled therefrom and from each other to allow them to be readily cleaned, so that the entire interior of the apparatus may be readily kept in sanitary condition.

In the modification shown in Figs. 9 and 10, the impeller 17' is circular, and the spacing blocks 20' are made to conform to the periphery thereof. To properly coöperate with the impeller, brakes 31 are mounted in upright position against the opposite walls of the vessel 1 (Fig. 1), and held therein by clips 32, the main part of which lies outside the vessel with a horizontal part 33 extending over the rim of the vessel, and having lugs 34 clamping the upper end of the brake in such a manner that a suitable fastening means 35 passing through the lugs and through the brake may hold the clip and brake rigidly together. The main part of the clip bends outwardly and downwardly on the outside of the vessel, and then bends inwardly with a part 36 to come against the outer side of the vessel. Extending laterally from the part 36 of the clip are arms 37 (Figs. 3 and 4) and there may be either one opening 38 in the middle, as shown in Fig. 3, or an opening 38' in each arm 37', as shown in Fig. 4. Past these lateral arms the clip bends outwardly forming a tongue 39 which may be engaged by the fingers for releasing the clip from the pin 40 which the opening 38 fits over; or, in the case of the modification of Fig. 4, from pins which the openings 38' fit over. This clip 32 thus constructed and applied to the brake 31 holds the brake up against the wall of the vessel by pressing inward against the outer side of the wall of the vessel, and holds the lower end of the brake firmly down on the bottom of the vessel by the engagement of the clip with the pin or pins. By having the two pins engaging with the two openings 38′ spaced apart as these openings are, the entire combination of brake and clip is more effectively prevented from twisting so that the brake is held firmly in its proper position in the vessel. Where there is only one pin in the middle, the arms 37, themselves, perform this function to a certain extent.

With the mechanism provided as above described, if the impeller is rotated it acts centrifugally and centripetally upon the liquid, making contact with the upper and lower surfaces of its upper and lower members, forcing the liquid radially outward between the two members and above them and below them while the periphery will present a substantially V-shaped formation. With the liquid thus impelled outwardly, areas of reduced pressure will be created in the central regions of the impeller, and air will be drawn down through the hollow shaft between the impellers. With the impellers thus formed and operated, the vibrations or undulations in the liquid around the periphery will be somewhat of a serpentine formation.

For separating butter from either sweet or sour cream, the liquid is placed in the vessel to about the height of the heavy dotted line, with the impeller about midway of the depth of the liquid as shown. It is important that the depth of the liquid above the impeller disk be not too great; otherwise the entrance of the air under atmospheric pressure will be hindered. It is also important that the distance between the impeller and the bottom of the vessel be not too great, because any considerable quantity of liquid too far below the impeller will not be affected by the aeration and other forces acting upon it, and will not have the butter separated from it, but will merely serve as a collecting place for the butter separated from the upper liquid. On the other hand it is highly desirable that the impeller disk be of considerable diameter in order to obtain the greatest amount of centrifugal and centripetal action without impact and to operate on as large a quantity of liquid as is desired. For this reason the proper disposition of the body of liquid will be such that its width is considerably greater than its depth, as illustrated in the drawing, and it is for this reason that the vessel is made wide and low so that it is possible for all the forces applied to the liquid to act upon it in a uniform manner.

The milk elements should not have their temperature too low or too high, about 55° or 60° Fahrenheit being the preferred temperature. Such temperature is high enough to allow the operation to be performed quickly, and it is not so high as to cause the resulting butter granules to be too soft. With this method butter may be produced within from three to ten minutes. Perceptible accumulation of butter will practically all take place during the last 15 or 60 seconds of the operation.

The butter will form in granules, and then the residue may be drawn off from the vessel and the granules salted by agitation and aeration of brine with the granules in the vessel.

When the salting operation is completed, the butter granules may be removed from the brine in the vessel, or the brine may be withdrawn from the butter granules, and the granules then removed from the vessel, after which the granules are worked or pressed into consistency for use.

The efficiency of operation is such that fully 90% of the butter fat of the cream is removed, and butter of purity of over 99% is obtainable, of firm texture and natural flavor.

Having fully described my invention, what I claim as new and desire to secure by Letters Patent is:

1. In apparatus for operating upon composite substances, a vessel, an impeller in said vessel comprising upper and lower flat members with plane upper and lower surfaces, and spacing pieces of material length secured between said members along their peripheries in spaced apart relation, whereby said members are held together substantially concentric, means for supplying air down to the space between said members, and means for supporting and rotating said impeller in said vessel.

2. In apparatus for operating upon composite substances, a vessel, an impeller in said vessel comprising upper and lower flat members with plane upper and lower surfaces, and spacing pieces, each with a V-shaped channeled end formation, secured between said members along their peripheries in spaced apart relation, whereby said members are held together substantially concentric, with alternate closed and polygonal open sides to the impeller, means for supplying air down to the space between said members, and means for supporting and rotating said impeller in said vessel.

3. In apparatus for operating upon composite substances, a vessel, an impeller in said vessel comprising upper and lower flat, circular members with plane upper and lower surfaces, and spacing pieces, each with a V-shaped channeled end formation secured between said members along their peripheries in spaced apart relation, whereby said members are held together substantially concentric, with alternate closed and polygonal open sides to the impeller, means for supplying air down to the space between said members, and means for supporting and rotating said impeller in said vessel.

4. In apparatus for operating upon composite substances, a vessel, a hollow impeller having a substantially central opening, a hollow shaft alined with said opening, a solid shaft extending down through said hollow shaft and through the opening in the impeller, means holding the impeller up on this solid shaft and causing said impeller to turn with said solid shaft, and a clamping means for the top of the hollow shaft comprising a hub and means on said hub to hold it stationary on said solid shaft, and arms extending from said hub across the upper edges of said hollow shaft, and having downwardly turned parts flanking said hollow shaft but leaving the top of the hollow shaft open, and said upper edges of said hollow shaft having upwardly opening notches receiving the respective arms of the clamping means, and means for supporting and rotating said shafts and impeller in said vessel.

5. In apparatus for operating upon composite substances, a vessel, a hollow impeller having a substantially central opening with an upwardly opening annular depression around it, a hollow shaft composed of separable sections fitting down in said depression, a solid shaft extending down through said hollow shaft and through the opening in the impeller, means holding the impeller up on this solid shaft and causing said impeller to turn with said solid shaft, and a clamping means for the top of the hollow shaft comprising a hub and means on said hub to hold it stationary on said solid shaft, and arms extending from said hub across the upper edges of the respective sections of said hollow shaft, and having downwardly turned parts flanking said sections but leaving the top of the hollow shaft open, and each one of said sections having an upwardly opening notch receiving the respective arm of the clamping means, and means for supporting and rotating said shafts and impeller in said vessel.

ALPHEUS FAY.

Witnesses:
CLARENCE PERDEW,
EDITH LOICHINGER.

Copies of this patent may be obtained for five cents each, by addressing the "Commissioner of Patents, Washington, D. C."